United States Patent [19]
Siegmund

[11] 4,378,952
[45] Apr. 5, 1983

[54] DYNAMIC IMAGE ENHANCER FOR FIBERSCOPES

[75] Inventor: Walter P. Siegmund, Woodstock, Conn.

[73] Assignee: Warner Lambert Technologies, Inc., Southbridge, Mass.

[21] Appl. No.: 178,318

[22] Filed: Aug. 15, 1980

[51] Int. Cl.³ .............................................. G02B 5/17
[52] U.S. Cl. .................................. 350/96.25; 350/6.3
[58] Field of Search ............... 350/6.2, 6.3, 96.25, 350/96.26, 247, 254; 356/127

[56] References Cited

U.S. PATENT DOCUMENTS

| | | |
|---|---|---|
| 3,016,785 | 1/1962 | Kapany . |
| 3,217,588 | 11/1965 | Chitayat . |
| 3,217,589 | 11/1965 | Chitayat . |
| 3,253,525 | 5/1966 | Merkel .............................. 350/436 |
| 3,606,522 | 9/1971 | Townes et al. ............. 350/247 UX |
| 3,706,848 | 12/1972 | Rouet ............................... 350/6.3 X |
| 3,913,568 | 10/1975 | Carpenter . |
| 4,141,624 | 2/1979 | Siegmund . |
| 4,154,502 | 5/1979 | Siegmund . |

Primary Examiner—Paul L. Gensler
Attorney, Agent, or Firm—Alan H. Spencer

[57] ABSTRACT

A fiberscope objective having an oscillating lens element which causes images formed by the objective to scan across a receiving end of an image-transporting fiber bundle for increased image resolution and bundle blemish suppression. Synchronous scanning of the opposite bundle end renders transported images stationary for viewing.

8 Claims, 3 Drawing Figures

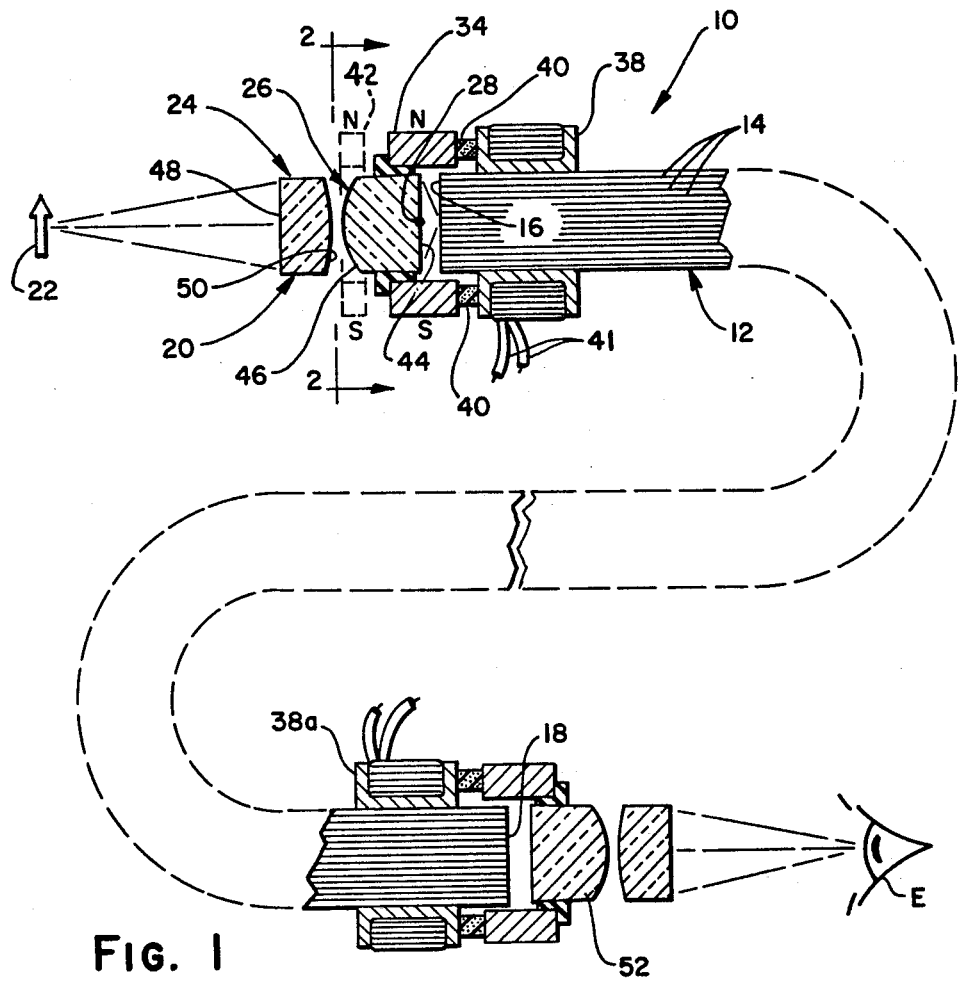
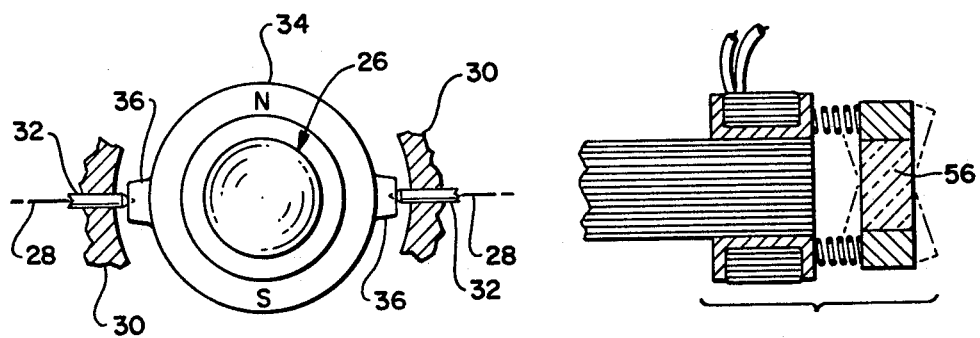
FIG. 1
FIG. 2
FIG. 3

DYNAMIC IMAGE ENHANCER FOR FIBERSCOPES

BACKGROUND OF THE INVENTION

1. Field of the Invention

This invention relates to improvements in fiber optic image transmitting devices and has particular reference to the enhancement of images transported thereby.

2. Discussion of the Prior Art

Bundles of optical fibers having their opposite ends arranged in identical geometrical patterns provide image transmitters which transport image-forming light according to the well-known principles of total internal reflection. The tightness of fiber packing and particular patterning of ends of the fibers, their diametral sizes and cladding thicknesses as well as fiber breakage and transmission variations individually and/or collectively affect resolution of transported images in both rigid and flexible bundles.

In recognition of the need to overcome image degradation resulting from fiber core spacing and occurrences of fiber breakage or blemishing by gas bubble or foreign matter inclusions, dynamic image enhancement schemes have been devised to integrate non-conducting or partially conducting fibers and spaces therebetween with the overall patterning of ends of the transporting bundles. The theory of dynamic scanning is explained in the Journal of the Optical Society of America, Volume 47, No. 5, May, 1957, pages 423-427 and also in the New York Academic Press, 1967, pages 88-99.

Presently used dynamic scanning systems, however, suffer from problems of ungainliness, complexity and high cost. At best they lack a compactness desired in the medical profession and segments of industry employing small varieties of fiberscopes. U.S. Pat. Nos. 3,016,785; 3,217,588; and 3,217,589 exemplify the complexity and ungainliness of early fiberscope dynamic scanning systems.

More recent systems accomplish image enhancement with oscillating glass plates or short optical fiber bundles positioned between the fiberscope objectives and fiber bundle image-receiving ends. U.S. Pat. Nos. 4,141,624 and 4,154,502 illustrate these systems. This inclusion of image-oscillating means between objective lenses and image-receiving fiberscope ends, however, defeats the distal compactness in endoscopes which can be accomplished with short-focus objectives.

Accordingly, an object of the present invention is to accomplish greater than usual distal compactness in fiber optic endoscopes employing dynamic image enhancement means, particularly in the smaller varieties of medical and industrial devices.

Another object is to accomplish the above with novel wide angle objective lens means and minimal aberration.

Other objects and advantages of the invention will become apparent from the following description.

SUMMARY OF THE INVENTION

Objects and advantages of the invention are accomplished with provision of a fiberscope objective having an oscillating lens component positioned close to the image-receiving end of a fiberscope fiber bundle. The objective per se causes images formed thereby to scan across the receiving end of the image-transporting bundle for accomplishing bundle blemish suppression. Synchronous scanning of the opposite bundle end renders transported images stationary for viewing.

Details of the invention will become more readily apparent from the following description when taken in conjunction with the accompanying drawings.

DESCRIPTION OF THE DRAWINGS

FIG. 1 is a partially cross-sectioned diagrammatic illustration of a preferred embodiment of the invention;

FIG. 2 is a cross-sectional view of the fiberscope system of FIG. 1 taken from the position of line 2—2 in FIG. 1; and FIG. 3 illustrates a modification of the image enhancing means.

DESCRIPTION OF THE PREFERRED EMBODIMENTS

Fiberscope 10 has been shown in diagrammatic fashion for ease of illustrating the invention. The components depicted are intended to be sheathed, details of which will not be dealt with herein. Those interested in such details, however, may refer to U.S. Pat. No. 3,913,568 which exemplifies a particular form of fiber optic endoscope to which the present invention is applicable but in no sense restricted.

Fiberscope 10 includes image-transmitting fiber bundle 12 of optical fibers 14 arranged with corresponding opposite ends identically geometrically patterned. Images directed against receiving face 16 become transported to emitting face 18 by the well-known principles of total internal reflection.

Image enhancement for fiber bundle blemish suppression is accomplished with objective 20 which produces images of objects 22 on face 16 of bundle 12.

Objective 20 comprises stationary first lens 24 and second lens 26 which is adapted to be oscillated about axis 28 (FIGS. 1 and 2). First lens 24 is fixed in the supporting structure 30 (FIG. 2) of fiberscope 10. Details of structure 30 are not critical to this invention and, accordingly, not shown. Any conventional fiberscope-supporting means may be used and/or modified as needed with ordinary skill. The structure illustrated in U.S. Pat. No. 3,913,568 is exemplary.

Pins 32 (FIG. 2) extending toward each other from structure 30 along axis 28 support permanent magnet 34 carrying second lens 26. Magnet 34 is preferably ring-shaped having lens 26 cemented or otherwise coaxially supported therewithin. Bearings 36, preferably jeweled, provide the pivotal connection with pins 32.

Adjacent to magnet 34 is AC solenoid 38 cemented or otherwise fixed to fiber bundle 12 near image-receiving face 16. With solenoid 38 de-energized, magnet 34 is held parallel to face 16 of bundle 12 by cushions 40 of foam rubber. Other similarly characterized materials, or springs, may be used. Cushions 40 permit tilting of magnet 34 back and forth relative to face 16 when poles N and S are alternately electrically attracted to AC solenoid, i.e. when the solenoid is energized. Thus, magnet 34 may be driven in harmonic oscillation about axis 28 at a frequency corresponding to that of an AC current supplied to leads 41. Cyclical motion of magnet 34 is insured by the restoring force of cushions 40. A second permanent magnet fixed forwardly of magnet 34 may be substituted for cushions 40. With north and south poles of the fixed second magnet opposing magnet 34 as illustrated in FIG. 1, magnet 34 will be constantly urged to a neutral parallel relationship with the fixed magnet. The fixed magnet is illustrated with broken lines 42.

For compactness, i.e. shortness, of the distal portion of fiberscope 10, objective 20 is designed with short back focus. A back focus which brings rear surface 44 of second lens 26 to a position of approximately 0.5 to 1.0 mm from fiber bundle face 16 for an object distance of approximately 25 mm is desirable.

In a preferred construction of objective 20, the back surface 44 of second lens 26 is flat and extended through axis 28 about which lens 26 is oscillated. Also, the center thickness of lens 26 is preferably controlled to be approximately equal to the radius of curvature of its front surface 46 or vice versa. Thus, oscillation of lens 26 about axis 28 will not produce axial movement of surface 46 relative to fixed lens 24.

Desirable lens 24 and 26 parameters include:
For lens 24; a refractive index of 1.518, flat front surface 48 and spherical rear surface 50 of approximately 6 mm radius.
For lens 26; a refractive index of 1.617, spherical front surface curvature of approximately 3 mm radius, rear surface 44 and center thickness of approximately 3 mm.

It should be understood that the center thickness of lens 24 may be varied as desired and further that the plane of surface 44 of lens 26 may be positioned away from axis 28, if desired. The above lens 26 design however, avoids secondary aberrations.

At the opposite proximal end of fiberscope 10 where images transmitted by bundle 12 are viewed with eye E, the scanning motion imparted to the images at face 16 and emitted at face 18 is stopped for stationary image viewing.

In FIG. 1 there is illustrated a symmetrical system wherein the fiberscope distal and proximal components are substantially identical. Motion imparted to images received by face 16 of bundle 12 is cancelled for viewing by oscillation of lens 26 and receiving lens 52 with identical phase and frequency. This may be accomplished by driving distal and proximal solenoids 38 and 38a from the same power source (e.g. 60 hertz AC) and matching amplitudes by adjusting voltage (or current) supplied to either or both solenoids. Eyepiece lenses (not shown) may be used before eye E for enhanced (magnified) viewing of the received images, if desired.

The system illustrated in FIG. 1 may also be proximally modified as illustrated in FIG. 3 wherein flat glass plate 56 is substituted for lens 52. Details of such a viewing arrangement may be found in U.S. Pat. Nos. 4,141,624 and 4,154,502 which further illustrate eyepiece lenses suitable for incorporation into either of the FIG. 1 or 2 embodiments of the present invention.

From the foregoing, it should be apparent that fiberscope image scanning is accomplished distally with objective lens means alone and thereby with minimal space requirement, reduced cost and complexity. Those skilled in the art will appreciate that various other forms and adaptations of the invention may be made to suit particular requirements. Accordingly, the present illustrations are not to be interpreted as restrictive of the invention beyond that necessitated by the following claims.

I claim:
1. In a dynamic image enhancing system for fiberscopes, the improvement comprising:
   a distal image-forming objective having first and second lenses, the first of said lenses being fixed in aligned spaced relationship with one end of an image-transporting fiber bundle of a fiberscope incorporating said image-enhancing system and the second of said lenses being positioned between said first lens and fiber bundle;
   means permitting pivoting of said second lens relative to said one end of said fiber bundle; and
   means for effecting said pivoting in controlled oscillating fashion for causing images produced by said objective to repeatedly scan across said one end of said fiber bundle.

2. The improvement according to claim 1 wherein said first lens and said one end of said fiber bundle are substantially aligned on a common axis and said second lens is pivoted about a second axis extending approximately right-angularly through said common axis.

3. The improvement according to claim 1 wherein said means for pivoting said second lens includes a permanent magnet and adjacent AC solenoid, one being stationary and the other fixed to said second lens.

4. The improvement according to claim 3 wherein said magnet is ring-shaped and fixed to said second lens, said solenoid being mounted upon said fiber bundle adjacent said one end thereof.

5. The improvement according to claim 2 wherein said second lens is provided with a flat image-emitting surface adjacent said one end of said fiberscope and an opposite curved surface, said second axis extending across said flat surface.

6. The improvement according to claim 5 wherein said second lens has a center thickness dimension approximately equal to the radius of said curved surface.

7. The improvement according to claim 1 including means proximally of said fiberscope for scanning the opposite end of said image-transporting fiber bundle synchronously with said scanning of said one end thereof.

8. In a dynamic image enhancing system for fiberscopes, the improvement comprising:
   an image transporting fiber bundle, an objective lens in aligned spaced relationship with one end of the fiber bundle, at least one component of said objective being arranged to pivot about an axis perpendicular to the optical axis of said objective and means for effecting said pivoting in controlled oscillating fashion for causing images produced by said objective to repeatedly scan across said one end of said fiber bundle.

* * * * *